United States Patent
Strange

(10) Patent No.: US 11,879,642 B2
(45) Date of Patent: Jan. 23, 2024

(54) SYSTEMS AND METHODS FOR AN ASSEMBLY THAT IS CONVERTIBLE BETWEEN A FIRE PIT, GRILL, GRIDDLE, SMOKER, AND/OR TABLE

(71) Applicant: James Cleveland Strange, Atlanta, GA (US)

(72) Inventor: James Cleveland Strange, Atlanta, GA (US)

( * ) Notice: Subject to any disclaimer, the term of this patent is extended or adjusted under 35 U.S.C. 154(b) by 379 days.

(21) Appl. No.: 17/155,417

(22) Filed: Jan. 22, 2021

(65) Prior Publication Data

US 2021/0404663 A1    Dec. 30, 2021

Related U.S. Application Data

(60) Provisional application No. 63/046,151, filed on Jun. 30, 2020.

(51) Int. Cl.
| | |
|---|---|
| *F24B 1/18* | (2006.01) |
| *F24B 1/182* | (2006.01) |

(Continued)

(52) U.S. Cl.
CPC ........... *F24B 1/182* (2013.01); *A47J 37/0704* (2013.01); *A47J 37/0763* (2013.01); *F24B 1/189* (2013.01); *A47J 2037/0795* (2013.01)

(58) Field of Classification Search
CPC .... A47J 37/0704; A47J 33/00; A47J 37/0763; A47J 2037/0795; F24B 1/182; F24B 1/189; F24B 3/00
See application file for complete search history.

(56) References Cited

U.S. PATENT DOCUMENTS

| | | | |
|---|---|---|---|
| 4,216,760 A | 8/1980 | Wiggins | |
| 5,183,027 A * | 2/1993 | Saldana | A47J 37/0704 |
| | | | 108/50.13 |

(Continued)

FOREIGN PATENT DOCUMENTS

| | | |
|---|---|---|
| GB | 6004405 | 12/2016 |
| GB | 6093196 | 6/2020 |
| GB | 6152569 | 8/2021 |

OTHER PUBLICATIONS

Fire Sense Roman Fire Pit, first available Nov. 1, 2011 [online], [site visited Jun. 6, 2022]. Available from internet, URL: <https://www.amazon.ca/Fire-Sense-Roman-Pit/dp/B004A9CE0Q> (Year: 2011).

*Primary Examiner* — Alfred Basichas
(74) *Attorney, Agent, or Firm* — Eversheds Sutherland (US) LLP

(57) ABSTRACT

Systems and methods for providing a convertible fire pit, grill, griddle, smoker and table apparatus are provided. The apparatus is configured such that a user can readily, easily, and safely convert the apparatus between a fire pit, a grill, and a smoker without tools. The apparatus may include a bowl, a grill frame support, e.g., a ring, positionable about the bowl, a shelf attachable to the grill frame support, a grate positionable within the bowl, and a grill frame positionable about grill frame support. The grill frame may be configured to rotate about the bearings within the grill frame support. The apparatus may also include interchangeable grill components positionable about the grill frame and a hood disposed above the grill frame.

20 Claims, 15 Drawing Sheets

(51) Int. Cl.
*A47J 37/07* (2006.01)
*F24B 1/189* (2006.01)

(56) References Cited

U.S. PATENT DOCUMENTS

| | | |
|---|---|---|
| D382,633 S | 8/1997 | Clemmer |
| D765,231 S | 8/2016 | Horsfield |
| D790,677 S | 6/2017 | Horsfield |
| D844,125 S | 3/2019 | Horsfield |
| D845,455 S | 4/2019 | Horsfield |
| 11,015,818 B1 | 5/2021 | Ritchie et al. |
| 2019/0101292 A1* | 4/2019 | Quigley .................. A47J 37/00 |
| 2019/0159630 A1* | 5/2019 | Salum .................. A47J 37/0763 |
| 2020/0139872 A1* | 5/2020 | Bates ....................... A47B 3/14 |
| 2021/0085126 A1* | 3/2021 | Bartlett ............... A47J 37/0704 |
| 2021/0404663 A1 | 12/2021 | Strange |

* cited by examiner

SYSTEMS AND METHODS FOR AN ASSEMBLY THAT IS CONVERTIBLE BETWEEN A FIRE PIT, GRILL, GRIDDLE, SMOKER, AND/OR TABLE

CROSS-REFERENCE TO RELATED APPLICATIONS

The disclosure claims priority to and the benefit of U.S. Provisional Patent Application No. 63/046,151, filed Jun. 30, 2020, which is hereby incorporated by reference herein in its entirety.

FIELD OF THE DISCLOSURE

The disclosure generally relates to a convertible fire pit, grill, griddle, smoker and table apparatus. The present disclosure enables a user to readily, easily, and safely convert from one type of use to another without tools.

BACKGROUND

People routinely use fire pits, barbecue grills, and smokers in outdoor living spaces and while camping. Although these types of outdoor activities are very popular, many consumers prefer to own one or another, but not all three. For some, limited space or storage is an issue, for others the cost and assembly. Others may not want to have a substantial portion of their patio or green space occupied by various items. Yet another problem is for people who enjoy camping. They may consider taking a fire pit, grill, or smoker but will not take all three due to space limitations in transport and at the camp site.

Although there have been attempts to address the problems associated with different uses of a single device, many retain the issues discussed above. It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

Figure 1:
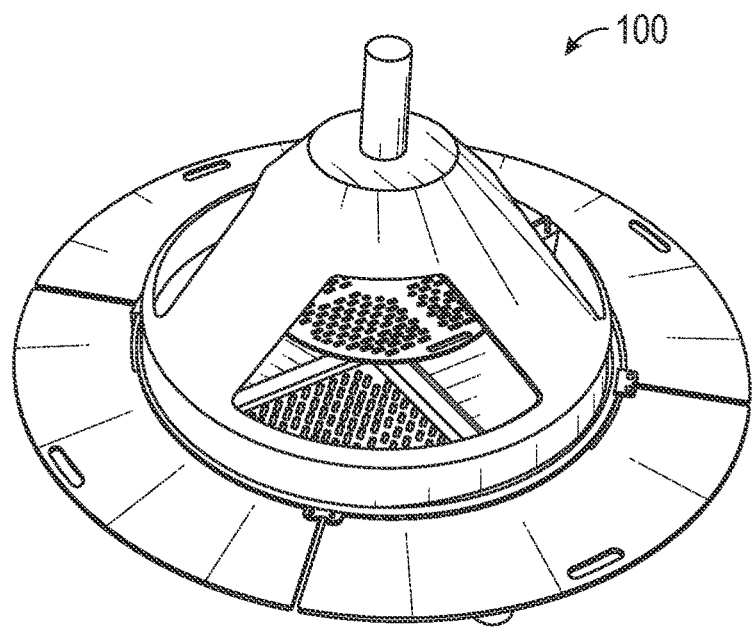
FIG. 1 illustrates an exemplary convertible fire pit, grill, griddle, smoker and/or table apparatus in accordance with one or more embodiments of the disclosure.

The Appendix of Figures includes various images and illustrations of additional fire pits and components thereof having other relative dimensions and configurations in accordance with one or more embodiments of the disclosure.

DETAILED DESCRIPTION

Overview

Some or all of the above needs and/or problems may be addressed by certain embodiments of the present disclosure. In some instances, the disclosure is directed to systems and methods for providing a convertible fire pit, grill, griddle, smoker and table apparatus. The apparatus is configured such that a user can readily, easily, and safely convert the apparatus between a fire pit, a grill, and a smoker without tools.

The apparatus may include a bowl, a ring positionable about the bowl, a shelf attachable to the ring, a grate positionable within the bowl, and a grill frame positionable about ring. The grill frame may be configured to rotate about the ring. The apparatus may also include a grill component positionable about the grill frame and a hood disposed above the grill frame.

In some instances, the bowl may include a support and a port. The support may include legs (e.g., three legs) extending from the bowl. The legs may provide support and stability to the bowl. The port may include a pipe or the like extending from =a lower portion of the bowl. The port may be configured to provide an air flow into the bowl. The air flow may be via natural convection or forced air via a blower or the like. In some instances, the bowl may include a gas connection for connecting a propane or natural gas supply to the bowl. Any suitable gas connection may be used herein.

The ring comprises a bearing, a shelf bracket, and a ledge. The ring is configured to nest on a lip of the bowl. The ring may be sized and shaped to correspond to the diameter of the bowl. In this manner, the ring may rest on the lip of the bowl. The bowl and lip may be any suitable size, shape, or configuration. Although described as a bowl and ring, in some instances, the bowl and ring may be rectangular in shape.

The bearing may comprise any suitable bearing capable of enabling the grill frame to rotate about the ring. In some instances, the bearing may include a number of ball bearings positioned on an inner diameter of the ring. For example, the ring may include a number of bearing brackets extending from an internal diameter of the ring. In some instances, the bearing brackets may extend from a lower edge of the ring such that the top side of the grill frame is substantially flush with the top side of the ring when the grill frame is disposed on the bearings. The bearings may be ball bearings or the like.

The grill frame may be configured to rotate about the bearings within the ring. In certain embodiments, the outer diameter of the grill frame may be less than or substantially the same as the inner diameter of the ring. In this manner, the grill frame may be configured to rotate within the ring. In some instances, the grill frame may include a handle or the like (e.g., a graspable protrusion) to facilitate rotation of the grill frame. In other instances, a user may simply engage the grill frame itself or a component attached thereto to rotate it.

The shelf bracket and ledge may extend outward away from the ring. In certain embodiments, the shelf bracket may extend from an upper portion of the ring, and the ledge may extend from a lower portion of the ring. The vertical space between the shelf bracket and the ledge may be sized and shaped to accommodate the thickness of the shelf. In some instances, the shelf bracket may include two shelf brackets disposed on opposite sides of the ledge. In such instances, the shelf may include pins that are configured to engage holes in the shelf brackets. In this manner, the shelf is configured to be disposed on top of the ledge and beneath the two brackets such that the pins engage the holes in the shelf brackets and the shelf is secured to the ring. In some instances, the shelf is arcuate. In other instances, the shelf may be rectangular. The shelf may be any suitable size, shape, or configuration. In certain embodiments, the shelf may be include a hinge in order to fold a portion of the shelf. The shelf may include a handle.

The grate may include a number of holes therethrough. The grate is configured to sit within the bowl below the grill frame. In some instances, the grate comprises dividers. The dividers may be any suitable size, shape, or configuration. The dividers are configured to partition the grate into multiple sections. Each section may accommodate the same or a different type or amount of fuel, such as wood, coal, charcoal, or the like. The dividers also may provide structural support to the grate. In some instances, the dividers may be integral to the grate. The dividers may include a handle in order to move and manipulate the grate. In some instances, the dividers and/or the grate may be omitted. The grate may also include one or more structure supports for providing additional structural integrity to the grate.

The grill frame may include an aperture. The aperture may be any suitable size, shape, or configuration. The aperture may be configured to accommodate the grill component. For example, the grill frame may include a number or apertures and a number of grill components. The grill components may be configured to interchangeably nest within the apertures. For example, each of the grill components may include a different type of cooking grid or surface. In this manner, a user may change (or "swap out") different grill components in each of the apertures. For example, some of the grill components may include various different types of grate grilling surfaces and patterns, while others may include stove top or griddle cooking surfaces. The grill components may be configured to rotate with the grill frame.

In some instances, each of the grill components may include a handle for removing and inserting the grill components into the apertures. In some instances, the grill frame may include a tab extending from a bottom portion of the grill frame into the aperture, and the grill components may be configured to rest on top of the tab such that the top surface of the grill frame is flush with the top surface of the grill components. In other instances, the grill components may include tabs that extend from the grill components and rest on top of and engage the grill frame.

In certain embodiments, the grill components may include a secondary grill spaced apart from the grill frame. The secondary grill may include a stand and a cooking surface. The stand may include one or more protrusions configured to mate with one or more slots in the grill frame.

The apparatus may include a hood. The hood may be configured to rest on the grill frame. In this manner, the hood may rotate with the grill frame. The hood may be removable. The hood may include apertures. In some instances, panels may be included to cover the apertures of the hood and enclose the hood. The hood may include a chimney.

Illustrative Embodiments

Figure 2:
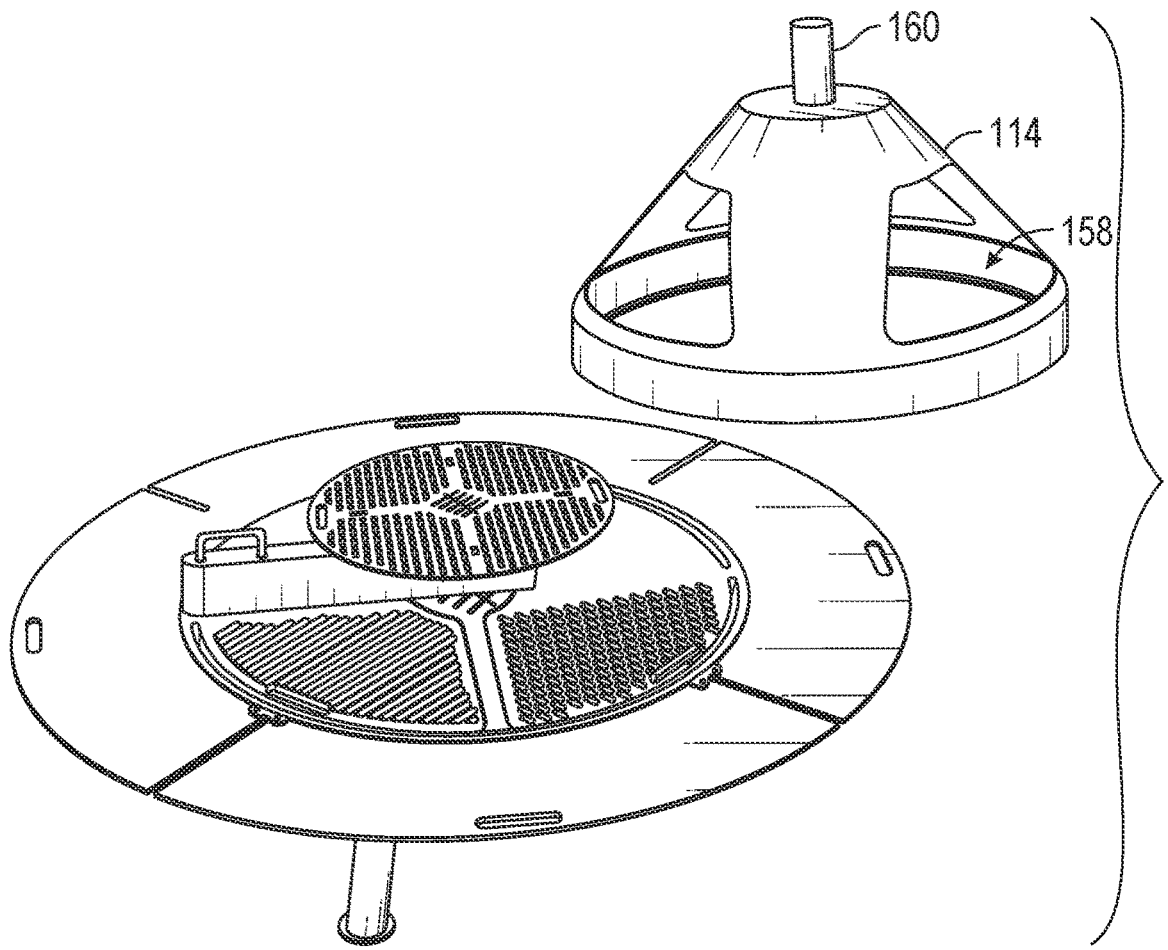
FIG. 2 illustrates the convertible fire pit, grill, griddle, smoker and/or table apparatus of FIG. 1 with the hood removed.

Referring now to the drawings, FIGS. 1-13 depicts an exemplary convertible fire pit, grill, griddle, smoker and/or table apparatus. FIG. 1 illustrates apparatus 100 in an assembled configuration. The apparatus 100 may include the hood 114. The hood 114 may be configured to rest on the grill frame 110. In this manner, the hood 114 may rotate with the grill frame 110. The hood 114 may be removable, as shown in FIG. 2. The hood 114 may include apertures 158. The hood 114 may include a chimney 160.

Figure 3:
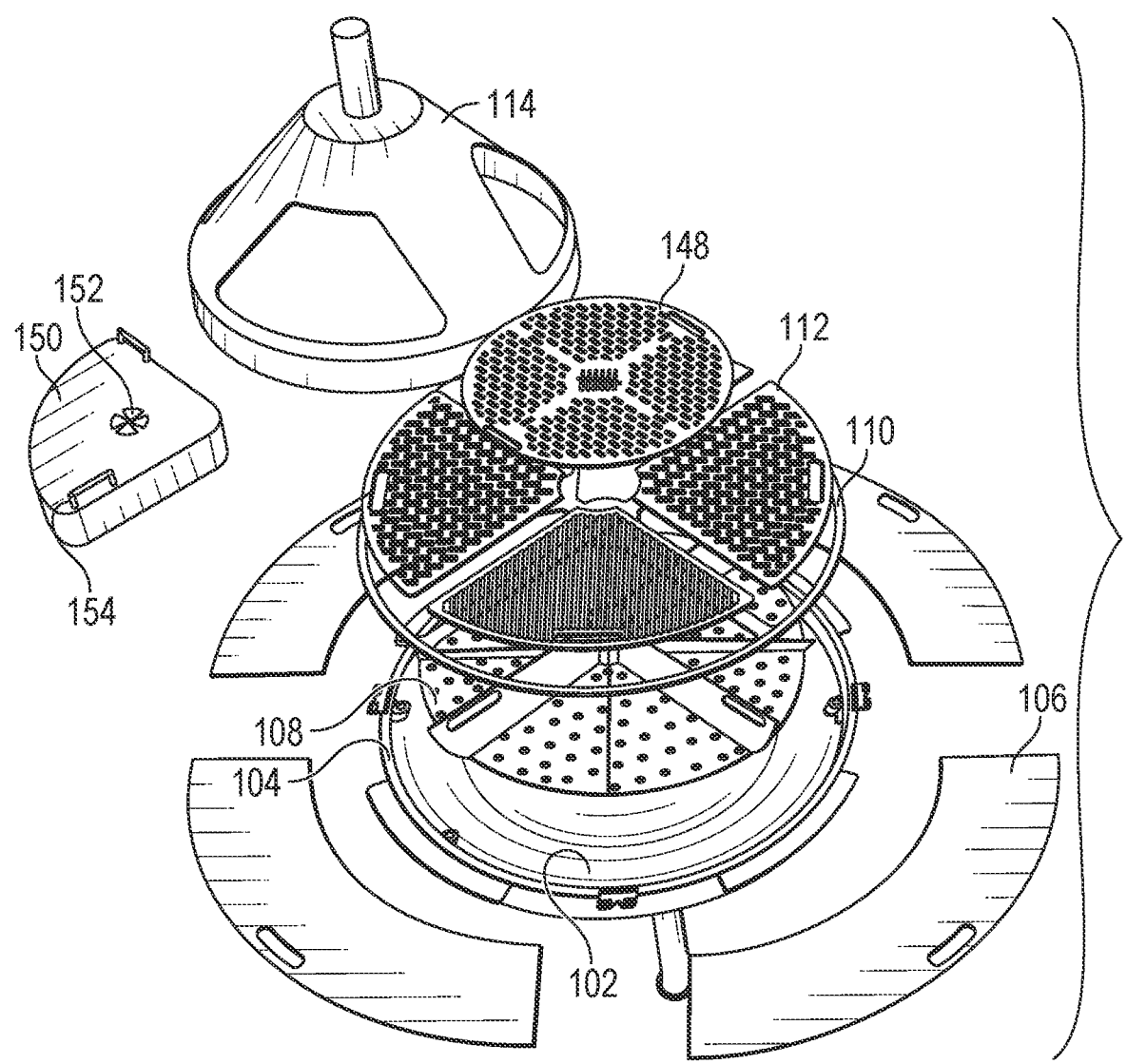
FIG. 3 is an exploded view of the convertible fire pit, grill, griddle, smoker and/or table apparatus of FIG. 1.

Referring now to FIG. 3, apparatus 100 may include a bowl 102, a ring 104 positionable about the bowl 102, a shelf 106 attachable to the ring 104, a grate 108 positionable within the bowl 102, and a grill frame 110 positionable about ring 104. The grill frame 110 may be configured to rotate about the ring 104. The apparatus 100 may also include a grill component 112 positionable about the grill frame 110 and a hood 114 disposed above the grill frame 110.

In some instances, one or more grill hoods 150 may be provided. The grill hoods 150 may be configured to be positioned over one or more of the grill components 112. The grill hoods may include a ventilation port 152 (such as a daisy vent or the like) and one or more handles 154. More so, the grill hoods 150 may include a thermometer.

Figure 4:
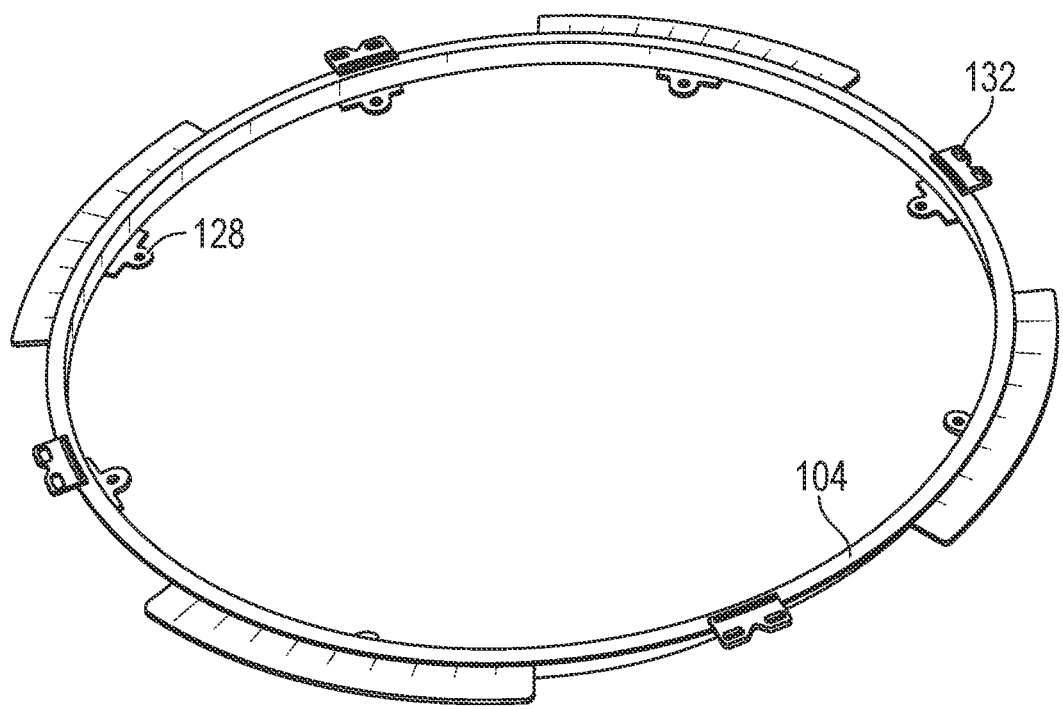
FIG. 4 illustrates an exemplary ring of the convertible fire pit, grill, griddle, smoker and/or table apparatus of FIG. 1 constructed in accordance with one or more embodiments of the disclosure.
Figure 5:
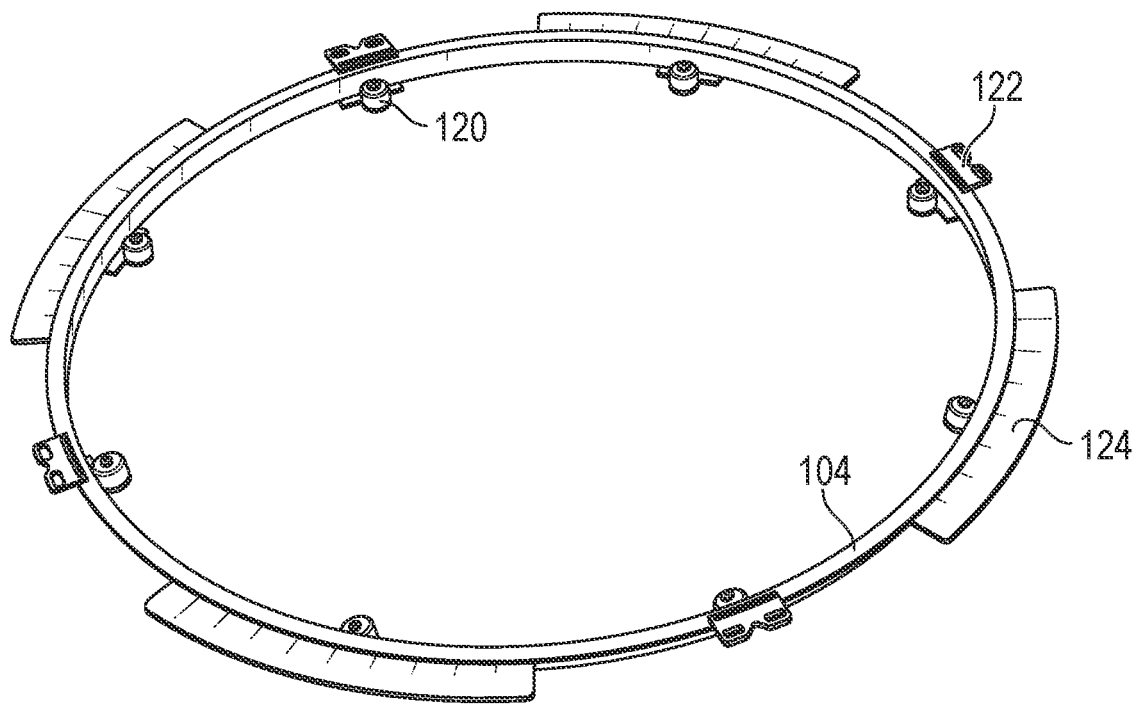
FIG. 5 illustrates the exemplary ring of FIG. 4 with a number of bearings in accordance with one or more embodiments of the disclosure.
Figure 6:
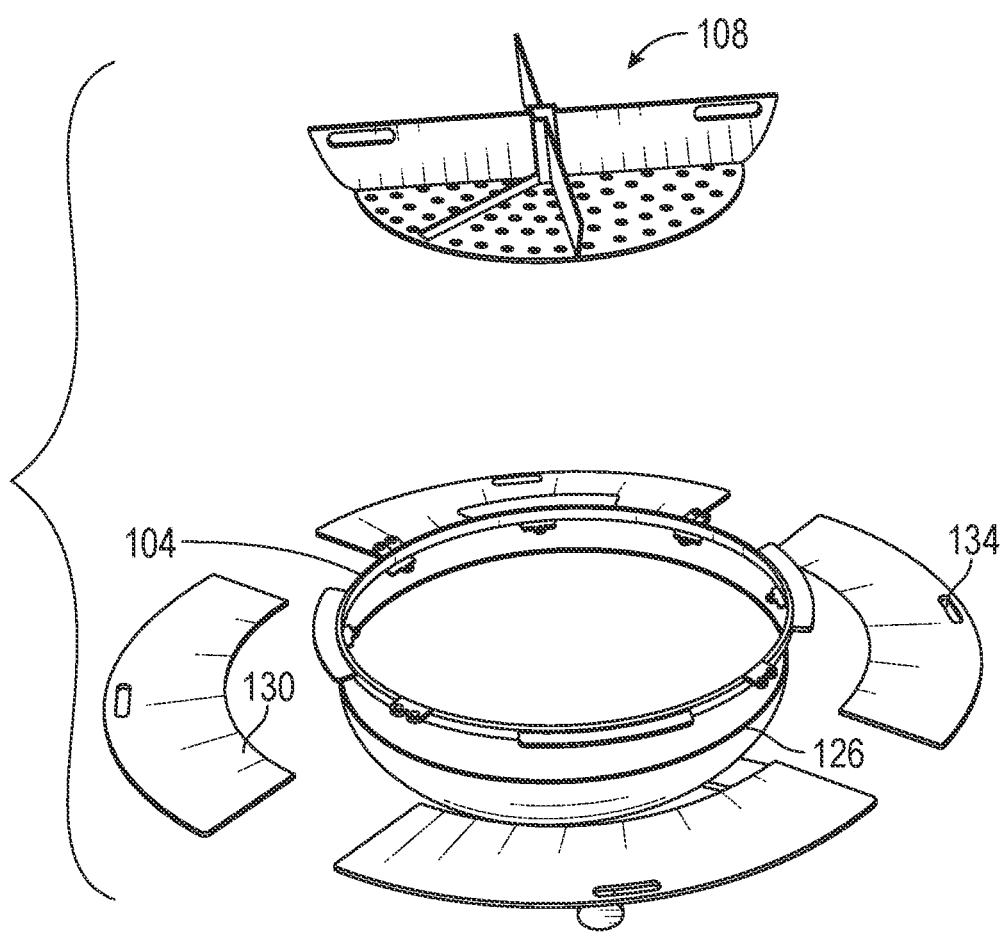
FIG. 6 is an exploded view of an exemplary bowl, ring, shelves, and grate in accordance with one or more embodiments of the disclosure.

As shown in FIGS. 4 and 5, the ring 104 comprises a bearing 120, a shelf bracket 122, and a ledge 124. The ring 104 is configured to nest on a lip 126 of the bowl 102. For example, the ring 104 may include a channel or the like configured to mate with the lip 126 of the bowl 102. The ring 104 may be sized and shaped to correspond to the diameter of the bowl 102. In this manner, the ring 104 may rest on the lip 126 of the bowl 102, as shown in FIG. 6. The bowl 102 and lip 126 may be any suitable size, shape, or configuration. Although described as a bowl and ring, in some instances, the bowl 102 and ring 104 may be rectangular in shape. Other shapes are envisioned as well. In other instances, the ring and bowl may be a unitary structure.

The bearing 120 may comprise any suitable bearing capable of enabling the grill frame 110 to rotate about the ring 104. In some instances, the bearing 120 may include a number of ball bearings or transfer bearings positioned on an inner diameter of the ring 104 (or the bowl). For example, the ring 104 may include a number of bearing brackets 128 extending from an internal diameter of the ring 104. In some instances, the bearing brackets 128 may extend from a lower edge of the ring 104 such that the top side of the grill frame 110 is substantially flush with the top side of the ring 104 when the grill frame 110 is disposed on the bearings 120. The bearings 120 may be ball bearings or the like.

Referring again to FIG. 5, the shelf bracket 122 and ledge 124 may extend outward away from the ring 104. In certain embodiments, the shelf bracket 122 may extend from an upper portion of the ring 104, and the ledge 124 may extend from a lower portion of the ring 104, or vice versa. The vertical space between the shelf bracket 122 and the ledge 124 may be sized and shaped to accommodate the thickness of the shelf 106. In some instances, the shelf bracket 122 may include two shelf brackets disposed on opposite sides of the ledge 124. In such instances, the shelf 106 may include pins 130 that are configured to engage holes 132 in the shelf brackets 124. In this manner, the shelf 106 is configured to be disposed on top of the ledge 124 and beneath the two brackets 122 such that the pins 130 engage the holes 132 in the shelf brackets 122 and the shelf 106 is secured to the ring 104. In some instances, the shelf 106 is arcuate. In other instances, the shelf 106 may be rectangular. The shelf 106 may be any suitable size, shape, or configuration. In certain embodiments, the shelf 106 may be include a hinge in order to fold a portion of the shelf. The shelf 106 may include a handle 134. Any number of shelves may be used herein. For example, the apparatus 100 may include 1, 2, 3, 4, 5, 6, 7, 8, and so on number of shelves.

Figure 7:
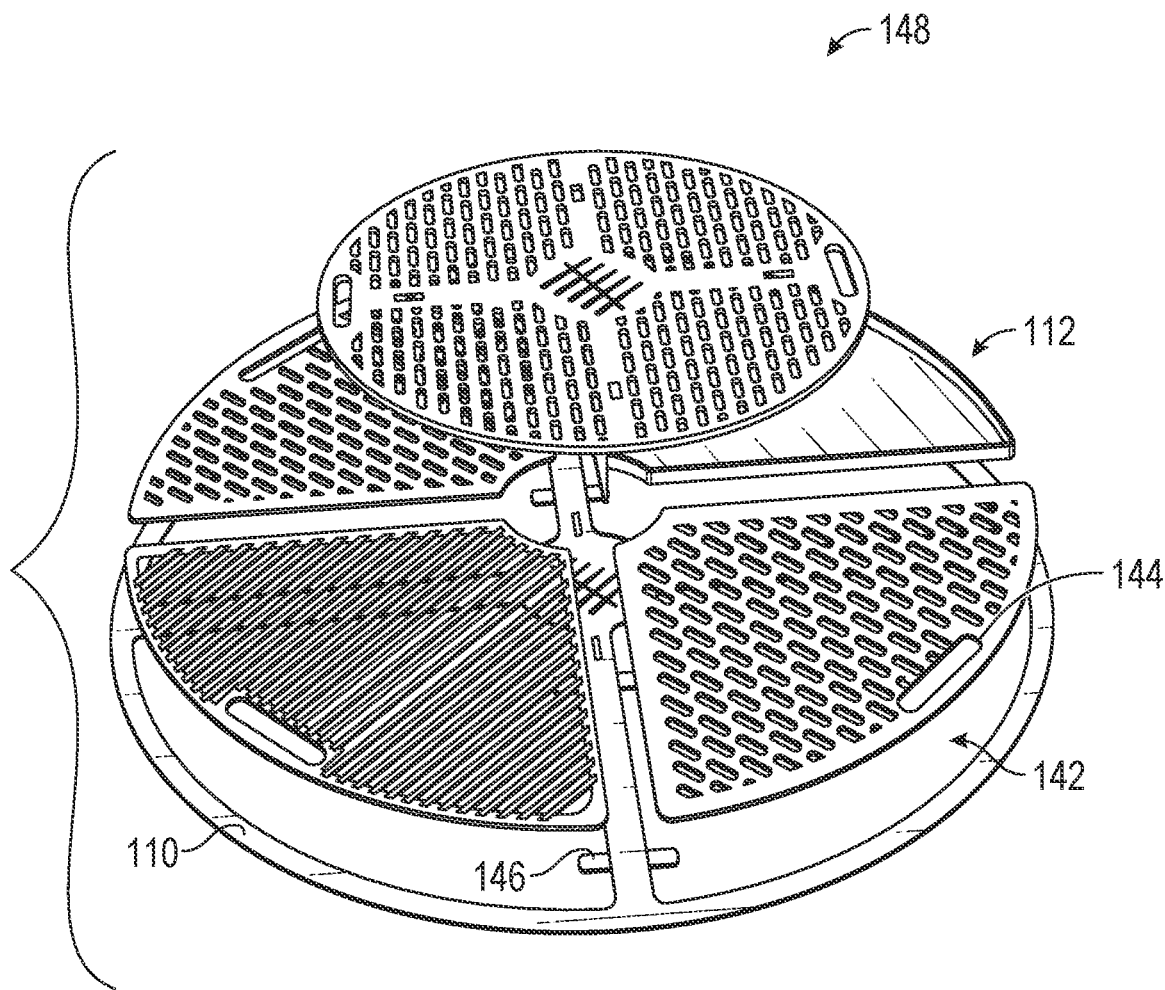
FIG. 7 is an exploded view of an exemplary grill frame, grill components, and secondary grill constructed in accordance with one or more embodiments of the disclosure.

Referring now to FIG. 7, the grill frame 110, the grill components 112, and the secondary grill 148 are provided. The grill frame 110 may be configured to rotate about the bearings 120 within the ring 104. In certain embodiments, the outer diameter of the grill frame 110 may be less than or substantially the same as the inner diameter of the ring 104. In this manner, the grill frame 110 may be configured to rotate within the ring 104. In some instances, the grill frame 110 may include a handle or the like (e.g., a graspable protrusion) to facilitate rotation of the grill frame 110. In other instances, a user may simply engage the grill frame 110 itself (or a handle of the grill frame 110) or a component attached thereto to rotate it. In certain embodiments, the grill frame 110 may be omitted, and the grill components 112 may sit directly on the bearings 120.

The grill frame 110 may include an aperture 142. The aperture 142 may be any suitable size, shape, or configuration. The grill frame 110 may include a single aperture or multiple apertures. For example, the grill frame 110 may include 1, 2, 3, 4, 5, 6, 7, 8, and so on number of apertures 142. The aperture 142 may be configured to accommodate the grill component 112. For example, the grill frame 110 may include a number of apertures 142 and a number of grill components 112. The grill components 112 may be configured to interchangeably nest within the apertures 142. For example, each of the grill components 112 may include a different type of cooking grid or surface. In this manner, a user may change (or "swap out") different grill components 112 in each of the apertures 142. For example, some of the grill components 112 may include various different types of grate grilling surfaces and patterns, while others may include stove top or griddle cooking surfaces. The grill components 112 may be configured to rotate with the grill frame 110. In some instances, the grill components 112 may comprise a single grill component configured to nest directly on the bearings 120 to rotate thereon.

In some instances, each of the grill components 112 may include a handle 144 for removing and inserting the grill components 112 into the apertures 142. In some instances, the grill frame 110 may include a tab 146 extending from a bottom portion of the grill frame 110 into the aperture 142, and the grill components 112 may be configured to rest on top of the tab 146 such that the top surface of the grill frame 110 is substantially flush with the top surface of the grill components 112. In other instances, the grill components 112 may include tabs that extend from the grill components 112 and rest on top of and engage the grill frame 110.

Figure 8:
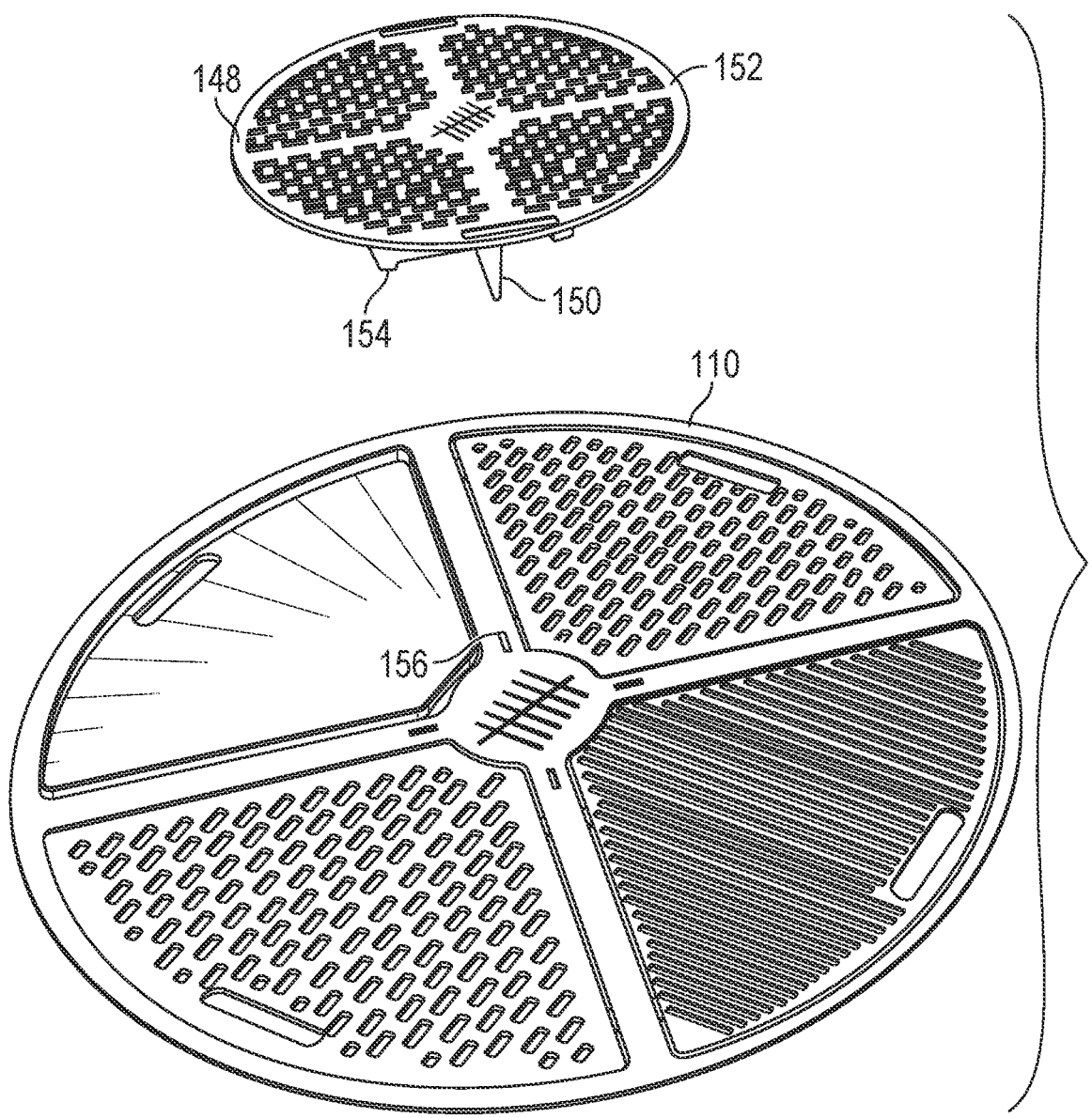
FIG. 8 illustrates another view of the exemplary grill frame, grill components, and secondary grill of FIG. 7.
Figure 9:
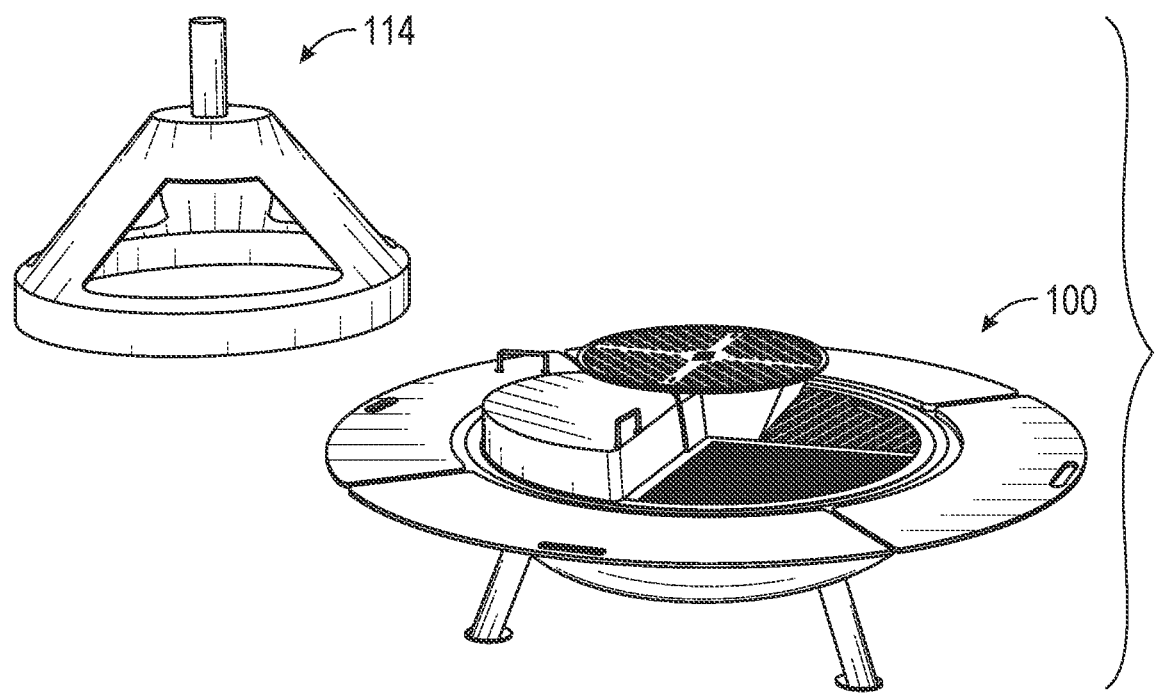
FIG. 9 illustrates another view of the convertible fire pit, grill, griddle, smoker and/or table apparatus of FIG. 1 with the hood removed.

As shown in FIG. 8, the grill components 112 may include a secondary grill 148 spaced apart from the grill frame 110. The secondary grill 148 may include a stand 150 and a cooking surface 152. The stand 150 may include one or more protrusions 154 configured to mate with one or more slots 156 in the grill frame 110, as shown in FIG. 9.

Figure 10:
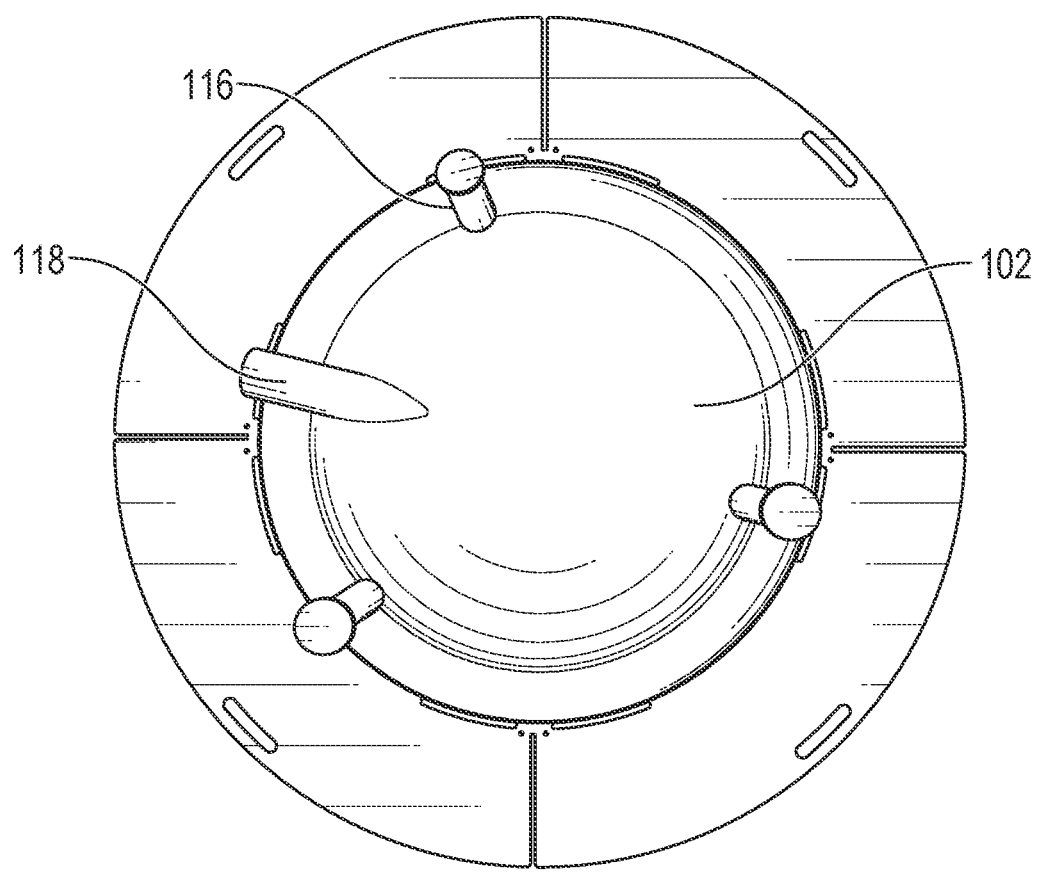
FIG. 10 illustrates a bottom view of the convertible fire pit, grill, griddle, smoker and/or table apparatus of FIG. 1.
Figure 11:
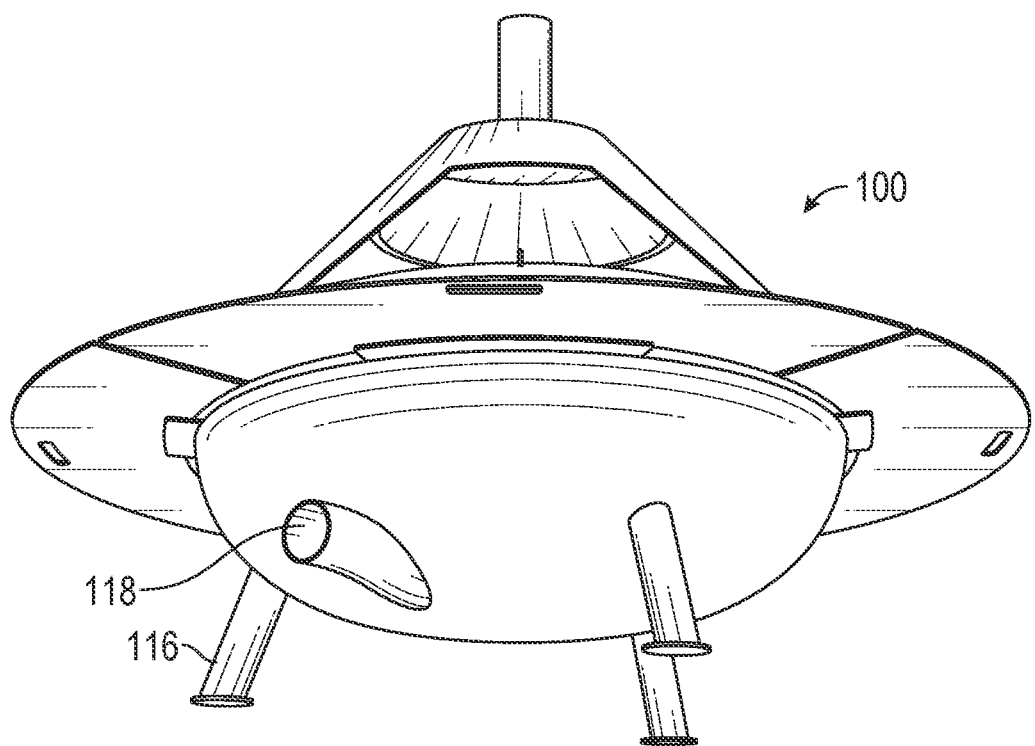
FIG. 11 illustrates a bottom side view of the convertible fire pit, grill, griddle, smoker and/or table apparatus of FIG. 1.
Figure 13:
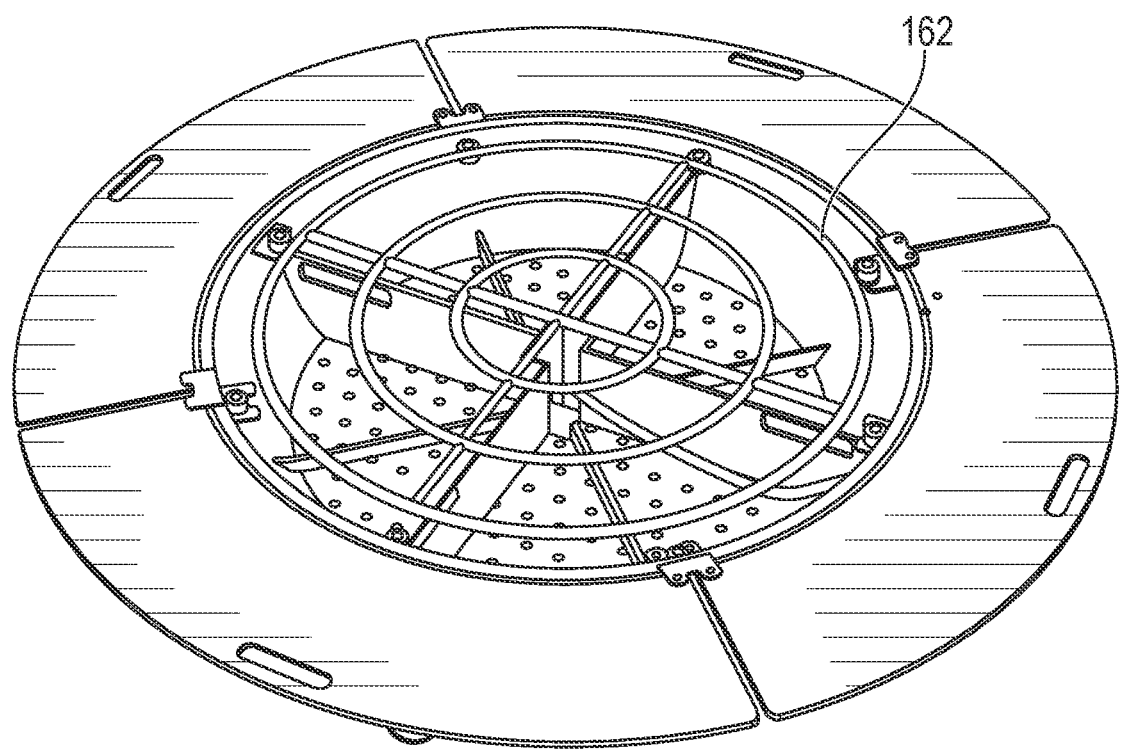
FIG. 13 illustrates an exemplary gas insert in accordance with one or more embodiments of the disclosure.

As shown in FIGS. 10 and 11, the bowl 102 may include a support 116 and a port 118. The support 116 may include legs (e.g., three legs) extending from the bowl 102. The legs may be any suitable size, shape, or configuration. The legs may provide support and stability to the bowl 102. Any number of legs may be used herein. The port 118 may include a pipe or the like extending from a lower portion of the bowl 102. The port 118 may be configured to provide an air flow into the bowl 102. The air flow may be via natural convection or forced air via a blower or the like. In some instances, the bowl 102 may include a gas connection for connecting a propane or natural gas supply to the bowl 102. Any suitable gas connection may be used herein. In this manner, the gas insert 162 may be disposed within the bowl 102 above the dividers 136 for providing gas functionality to the apparatus 100, as shown in FIG. 13.

Figure 12:
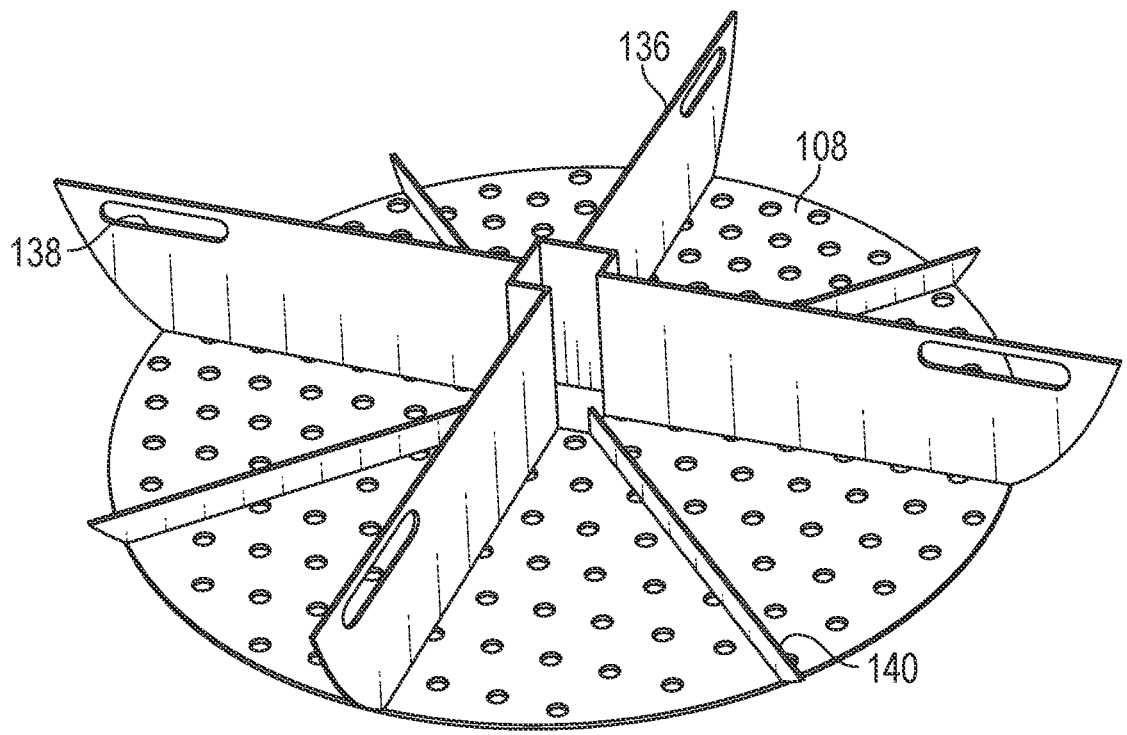
FIG. 12 illustrates an exemplary grate constructed in accordance with one or more embodiments of the disclosure.

As shown in FIG. 12, the grate 108 may include a number of holes therethrough. The grate 108 is configured to sit within the bowl 102 below the grill frame 110. In some instances, the grate 108 comprises dividers 136. The dividers 136 may be any suitable size, shape, or configuration. The dividers 136 are configured to partition the grate 108 into multiple sections. Each section may accommodate the same or a different type or amount of fuel, such as wood, coal, charcoal, or the like. The dividers 136 also may provide structural support to the grate 108. In some instances, the dividers 136 may be integral to the grate 108. The dividers 136 may include a handle 138 in order to move and manipulate the grate 108. In some instances, the dividers 136 may be omitted. The grate 108 may also include one or more structure supports 140 for providing additional structural integrity to the grate.

Figure 14:
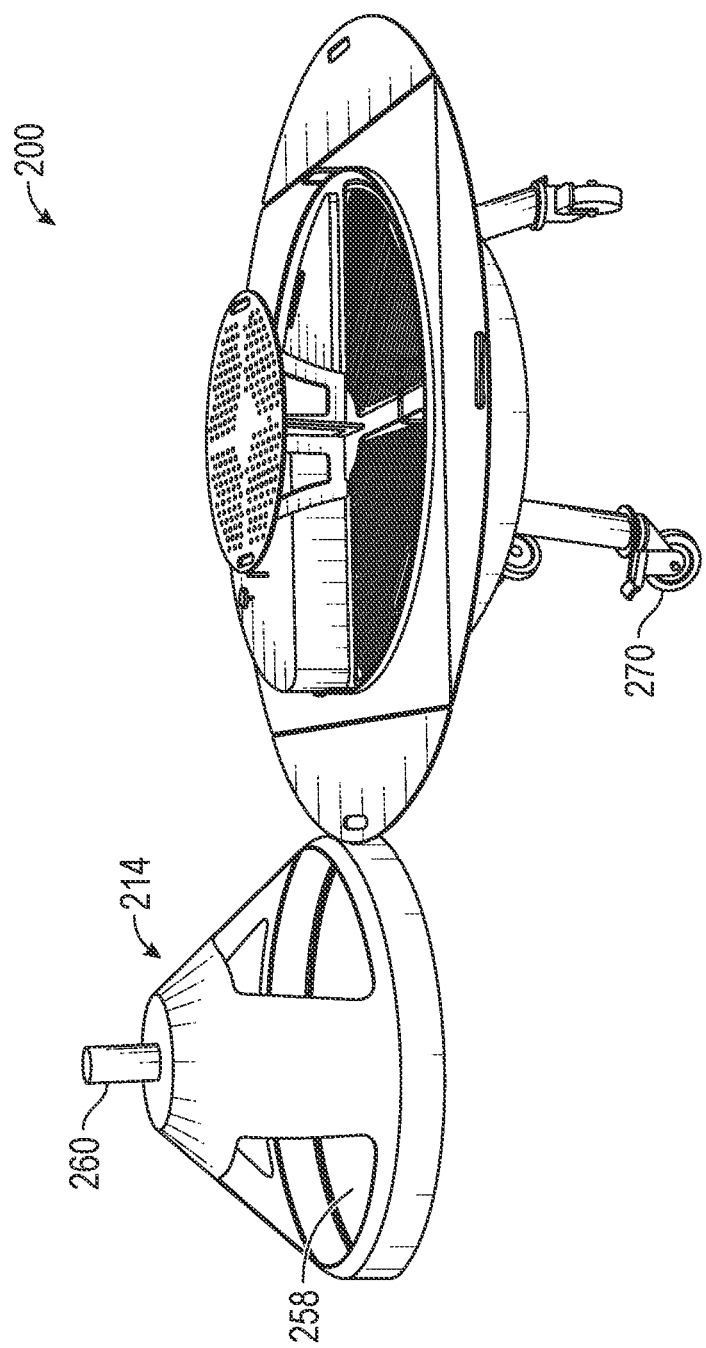
FIG. 14 illustrates another exemplary convertible fire pit, grill, griddle, smoker and/or table apparatus in accordance with one or more embodiments of the disclosure.
Figure 15:
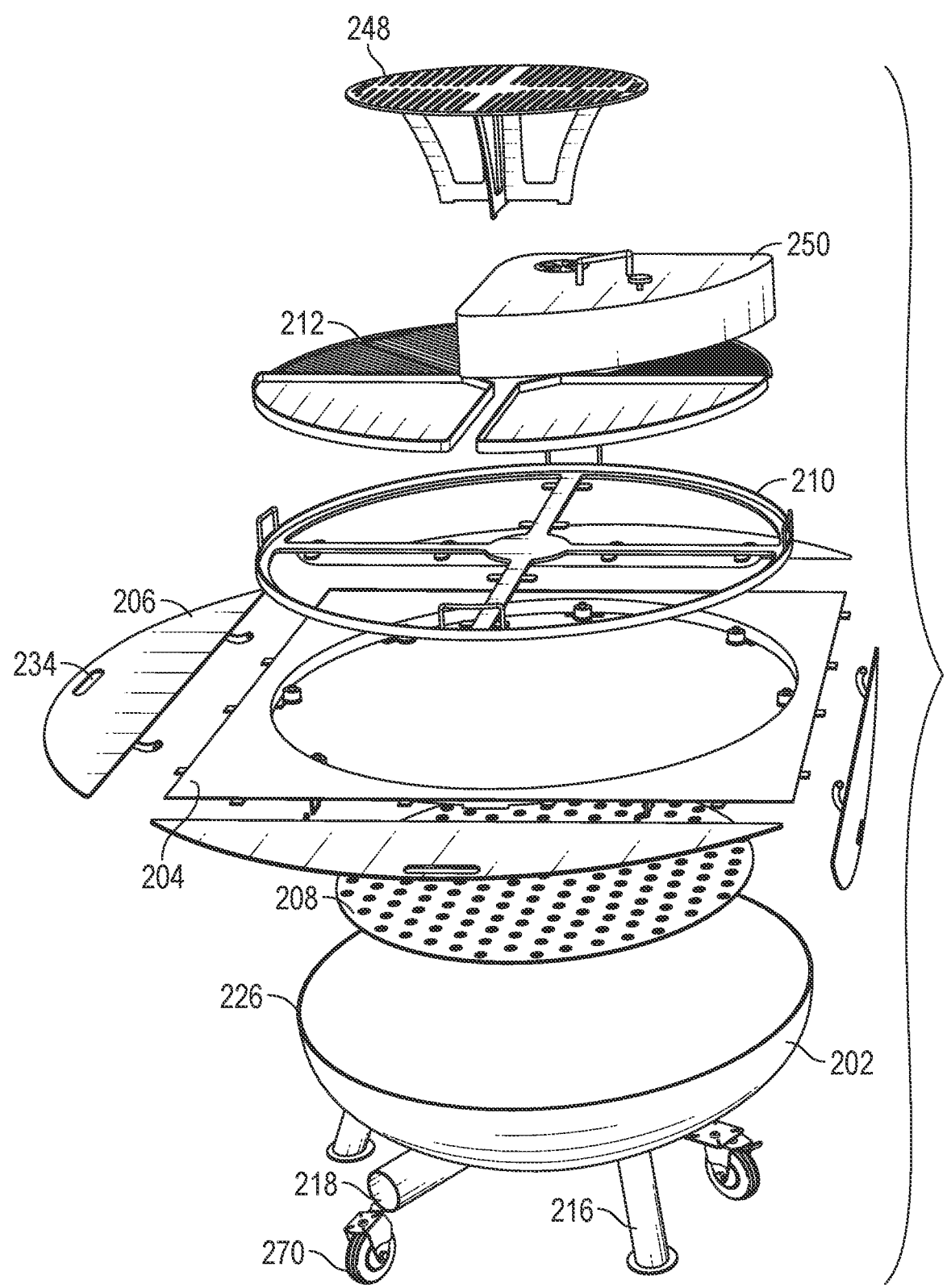
FIG. 15 is an exploded view of the exemplary convertible fire pit, grill, griddle, smoker and/or table apparatus of FIG. 14.

Referring now to FIG. 14, another exemplary convertible fire pit, grill, griddle, smoker and/or table apparatus is provided. Apparatus 200 may be constructed similar to the apparatus 100 described above. For example, as shown in FIG. 14, the apparatus 200 may include a hood 214 having a chimney 260 and apertures 258, which may be constructed similar to the hood 114 having the chimney 160 and apertures 158. Moreover, as shown in FIG. 15, the apparatus 200 may include a bowl 202 having a support 216, e.g., one or more legs, and a port 218 for providing an air flow into the bowl 202, which may be constructed similar to the bowl 102 having the support 116 and the port 118. As shown in FIG. 15, the support 216 further may include castor wheels 270 for providing mobility to apparatus 200. The castor wheels 270 may be removeably coupled to the one or more legs of the support 216, and may include a braking mechanism to fix the castor wheels 270, and accordingly the apparatus 200, in a stationary position relative to the ground.

Figure 16:
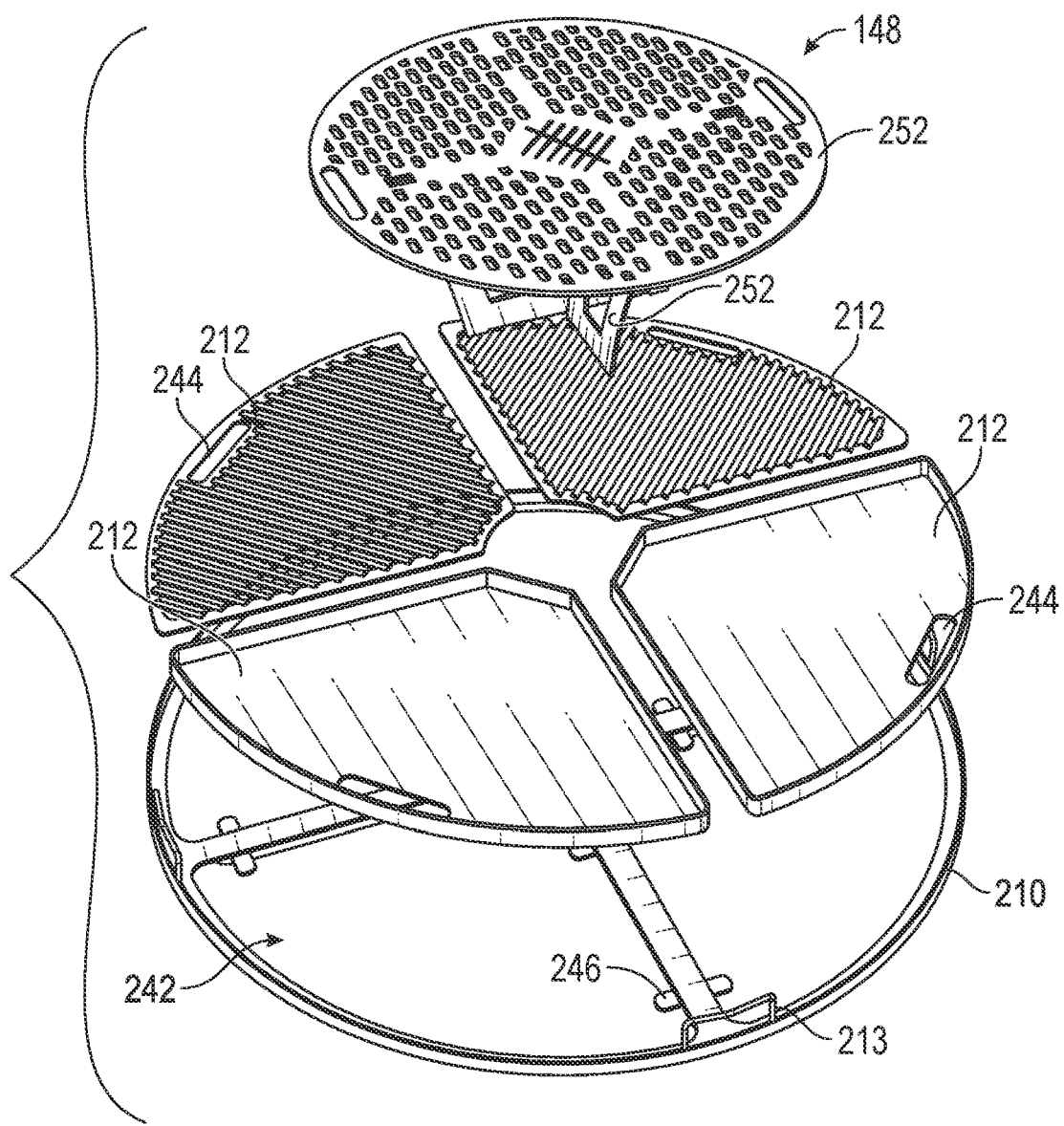
FIG. 16 is an exploded view of another exemplary grill frame, grill components, and secondary grill constructed in accordance with one or more embodiments of the disclosure.

Moreover, as shown in FIG. 16, the apparatus 200 may include a grill frame 210, grate components 212, a grill hood 250, and a secondary grill 248, which may be constructed similar to the grill frame 110, grate components 112, the grill hood 150, and the secondary grill 148. As shown in FIG. 16, the grill frame 210 further may include handles 213 in order to move and manipulate the grill frame 210. For example, the handles 213 may include two handles on opposite edges extending upward from the upper surface of the grill frame 210.

Figure 17:
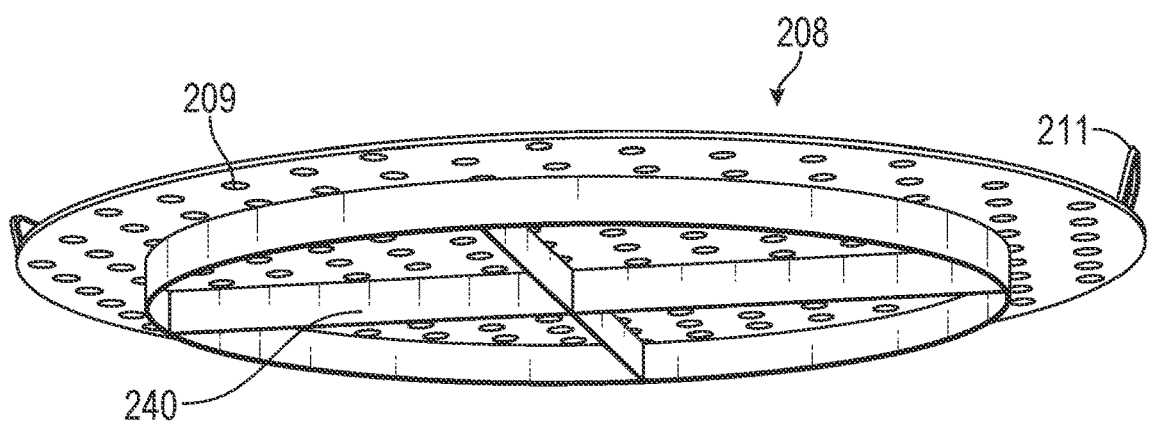
FIG. 17 illustrates another exemplary grate constructed in accordance with one or more embodiments of the disclosure.

The apparatus 200 may differ from the apparatus 100 in that the apparatus 200 may include a grate 208 instead of the grate 108, as shown in FIG. 17. Like the grate 108, the grate 208 may include a number of holes 209 therethrough. The grate 208 is configured to sit within the bowl 202 below the grill frame 210. The grate 208 further may include handles 211 in order to move and manipulate the grate 208. For example, the handles 211 may include two handles on opposite edges of the top surface of the grate 208. Unlike the grate 108, the grate 208 may not include dividers. The grate 208 also may include one or more structure supports 240 for providing additional structural integrity to the grate. As shown in FIG. 17, the one or more structure supports 240 may extend along a bottom surface of the grate 208, and may have include two support structures extending perpendicular to each other. The support 240 further may include a circular support structure, such that the perpendicular support structures extend within the circular support structure, thereby providing additional support to the grate 208.

Figure 18:
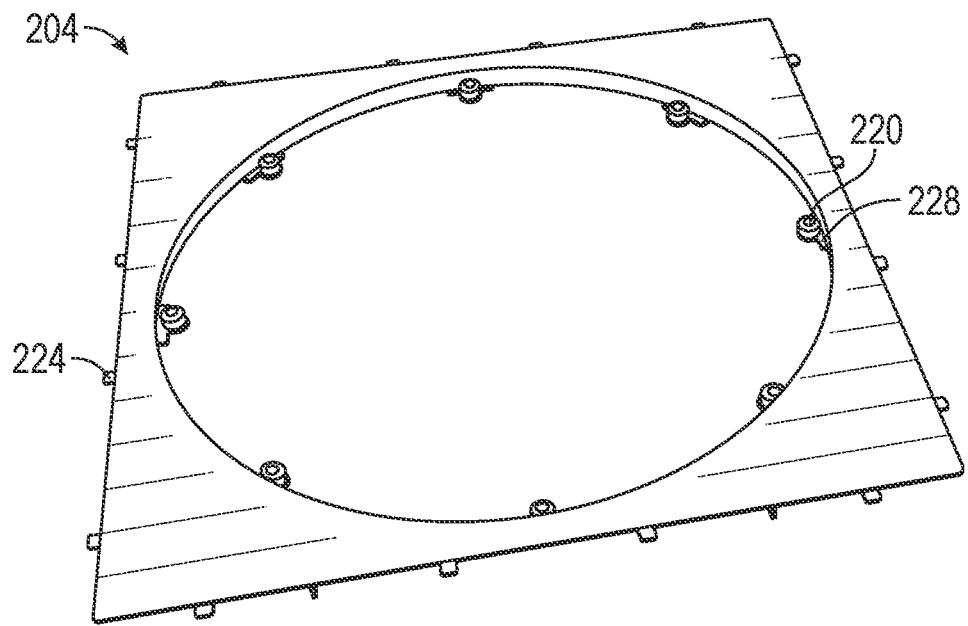
FIG. 18 illustrates an exemplary grill frame support constructed in accordance with one or more embodiments of the disclosure.

Moreover, the apparatus 200 may differ from the apparatus 100 in that the apparatus 200 may include a grill frame support 204 instead of the ring 104, as shown in FIG. 18. Like the ring 104, the grill frame support 204 may have a circular aperture. The grill frame support 204 is configured to nest on a lip 226 of the bowl 202. For example, the grill frame support 204 may include a channel or the like extending along the aperture configured to mate with the lip 226 of the bowl 202. The aperture of the grill frame support 204 may be sized and shaped to correspond to the diameter of the bowl 202. In this manner, the grill frame support 204 may rest on the lip 226 of the bowl 202. The bowl 202 and lip 226 may be any suitable size, shape, or configuration. Although described as a bowl and circular aperture, in some instances, the bowl 202 and the aperture of the grill frame support 204 may be rectangular in shape. Other shapes are envisioned as well. In other instances, the grill frame support and bowl may be a unitary structure.

In addition, like the ring 104, the grill frame support 204 may include a number of bearing brackets 228 extending from an internal diameter of the grill frame support 204 into the aperture of the grill frame support 204. The grill frame support 204 further may include a number of bearings 220, which may comprise any suitable bearing capable of enabling the grill frame 210 to rotate about the grill frame support 204. The bearings 220 may comprise any suitable bearing capable of enabling the grill frame 210 to rotate about the grill frame support 204. For example, the bearings 220 may be ball bearings or the like. In some instances, the bearing brackets 228 may extend from a lower edge of the grill frame support 204 such that the top side of the grill frame 210 is substantially flush with the top side of the grill frame support 204 when the grill frame 210 is disposed on the bearings 220.

Figure 19:
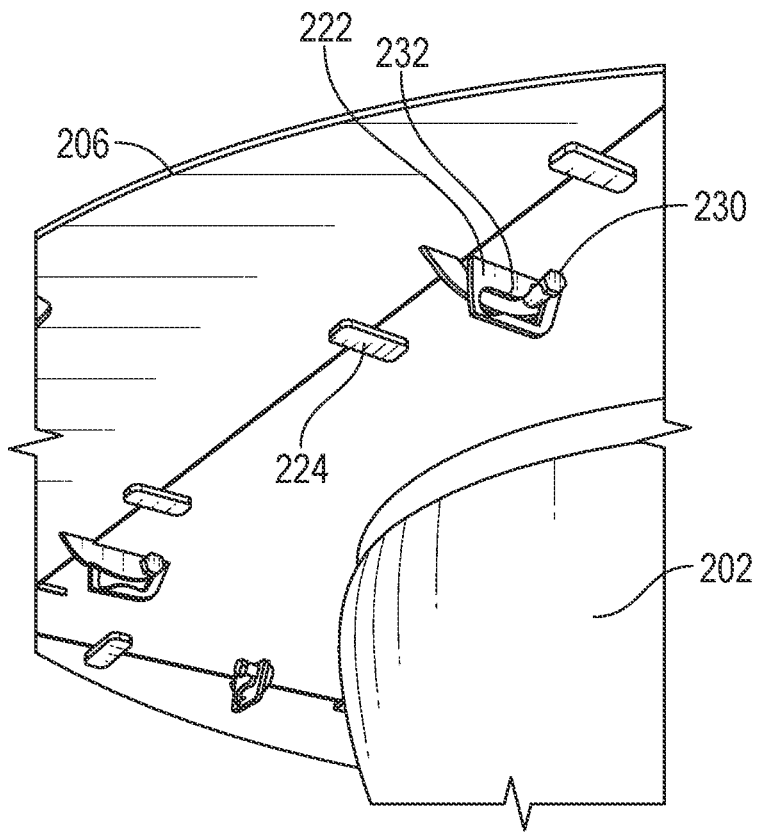
FIG. 19 illustrates an exemplary shelf lock mechanism constructed in accordance with one or more embodiments of the disclosure.

As shown in FIG. 18, the outer perimeter of the grill frame support 204 may have a square/rectangular shape. In addition, the grill frame support 204 may include a number of shelf brackets 222 and ledges 224 along the outer perimeter. For example, the shelf brackets 222 and ledges 224 may extend outward away from the grill frame support 204. In certain embodiments, the shelf brackets 222 and the ledges 224 may extend from a lower portion of the grill frame support 204. As shown in FIG. 19, the ledges 224 may extend beyond the outer perimeter of the grill frame support 204; whereas, the shelf brackets 222 may not extend beyond the outer perimeter of the grill frame support 204. The vertical space between the upper surface of the ledges 224 and the upper surface of the grill frame support 204 may be sized and shaped to accommodate the thickness of the shelf 206.

As shown in FIG. 19, each edge of the grill frame support 204 may include four ledges 224 and two shelf brackets 222, such that a first shelf bracket is positioned in between a first ledge and a second ledge, and a second shelf bracket is positioned between a third edge and a fourth ledge. As will be understood by a person having ordinary skill in the art, a variety of number of ledges and brackets may be used on each edge of the grill frame support. For example, each edge of the grill frame support 204 may include three ledges 224 and two shelf brackets 222, such that a first shelf bracket is positioned in between a first ledge and second ledge, and a second shelf bracket is positioned between the second ledge and third ledge.

As further shown in FIG. 19, the shelf 206 may include pins 230 that are configured to engage slots/holes 232 in the shelf brackets 222. For example, the pins 230 may include a curved portion extending from the lower surface of the shelf 206 in a direction perpendicular to the edge of the grill frame support 204, and a pin portion extending away from the curved portion parallel to the edge of the grill frame support 204. The holes 232 of the shelf brackets 222 may extend parallel to the curved portion of the pins 230, such that the pin portion of the pins 230 may extend through the holes 232 as shown in FIG. 19. The holes 232 may have a non-fitted portion and a fitted portion, such that the shelf 206 may transition from a retracted position when the pins 230 are engaged with the non-fitted portion of the holes 232 and an expanded position when the pins 230 are engaged with the fitted portion of the holes 232. In this manner, the shelf 206 is configured to be disposed on top of the ledge 224 when the pins 230 are engaged with the fitted portion of the holes 232 and the shelf 206 is secured to and planar with the grill frame support 204. Accordingly, to retract the shelf 206, the outer edge of the shelf 206 may be lifted upward relative to the grill frame support 204, e.g., above the ledges 224, such that the pins 230 disengage with the fitted portion of the holes 232 and are positioned within the non-fitted portion of the holes 232. The shelve 206 may then be pulled radially away from the grilled frame support 204 such that the inner edge of the shelf 206, e.g., the edge of the shelf 206 parallel to the outer edge of the grill frame support 204, is positioned beyond the ledges 224, and the shelf may fold downward relative to the grill frame support 204 via the pins 230 and the holes 232 of the shelf brackets 222.

In some instances, the outer edge of the shelf 206 is arcuate. In other instances, the outer edge of the shelf 206 may be rectangular. The shelf 206 may be any suitable size, shape, or configuration. In certain embodiments, the shelf 206 may be include a hinge in order to fold a portion of the shelf. The shelf 206 may include a handle 234, as shown in FIG. 15. Any number of shelves may be used herein. For example, the apparatus 200 may include 1, 2, 3, 4, 5, 6, 7, 8, and so on number of shelves.

Figure 20:
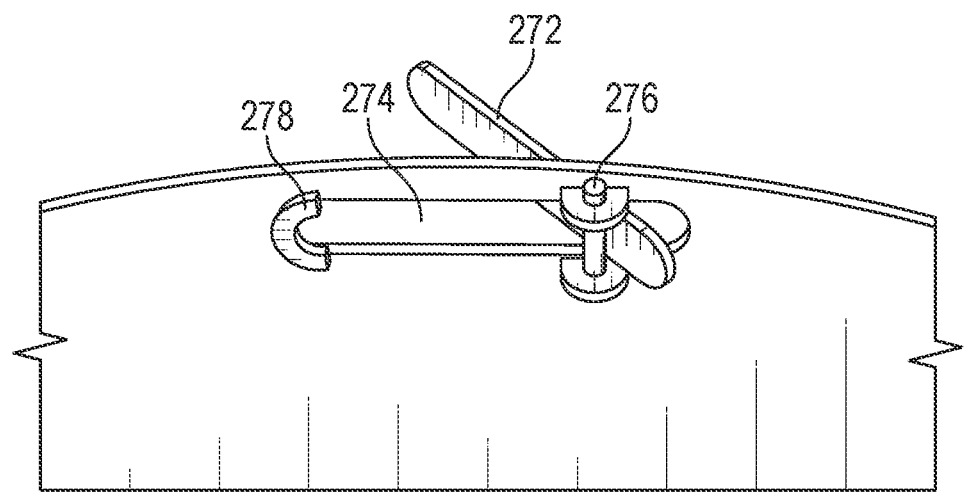
FIG. 20 illustrates an exemplary handle constructed in accordance with one or more embodiments of the disclosure.

Referring now to FIG. 20, an exemplary handle configuration is described. The handle may include a handle portion 272 pivotally coupled to an aperture 274 via a hinge 276. The aperture 274 may be sized and shaped to receive the handle portion 272. In addition, the handle may include a lip 278 extending from a lower surface of the handle, the lip 278 sized and shaped to engage with at least a portion of the handle portion 272. The lip 278 and the hinge 276 may be disposed on opposite sides of the aperture 274. In addition, the vertical space of the aperture 274 may be sized and shaped to accommodate the thickness of the handle portion 272. Thus, when the handle portion 272 is resting on the lip 278 within the aperture 274, the handle portion 272 is substantially flushed with the handle. The handle described herein may replace any of the handles described above. For example, the handle may be integrated with the shelves, the grill frames, the grill components, the grill hoods, the grates, etc., described above. Accordingly, when the handle portion 272 is resting on the lip 278 within the aperture 274, the handle portion 272 is substantially flushed with the top surface of the corresponding component.

Figure 21:
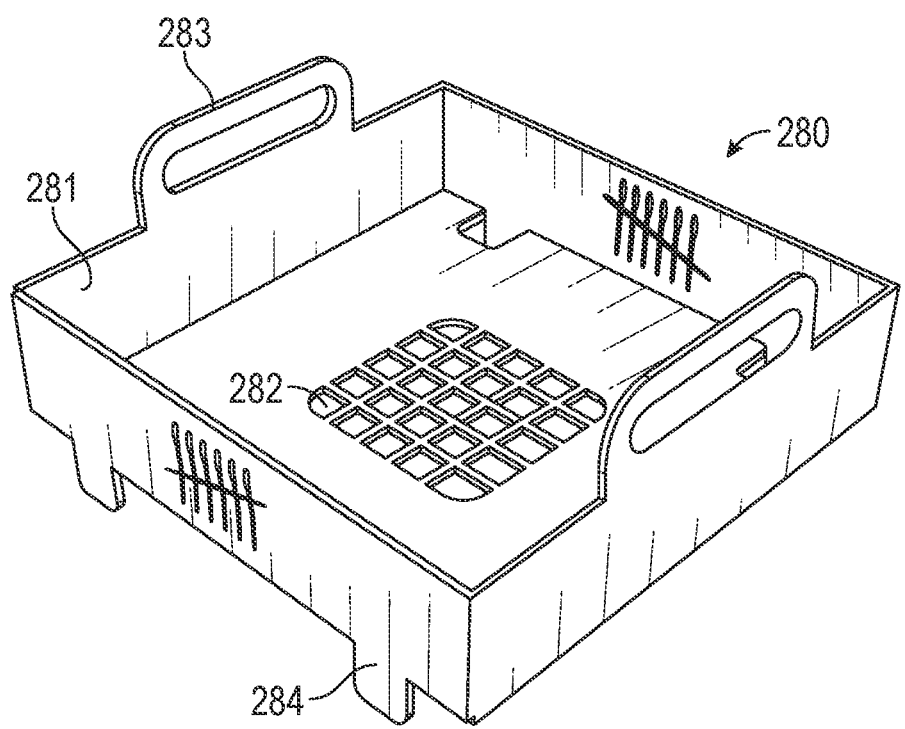
FIG. 21 illustrates an exemplary firebox constructed in accordance with one or more embodiments of the disclosure.

Referring now to FIG. 21, an exemplary fire box 280 is provided. The fire box 280 may be sized and shaped to fit within the bowl 202, and may have a plurality of walls 281 for containing, e.g., fire wood or coal. As shown in FIG. 21, the floor of the fire box 280 may include a plurality of holes 282 to provide ventilation as well as receive debris therethrough. The fire box 280 further may include handles 283 for moving the fire box 280, as well as a plurality of supports 284, e.g., legs, for sitting against the bowl 202.

Figure 22:
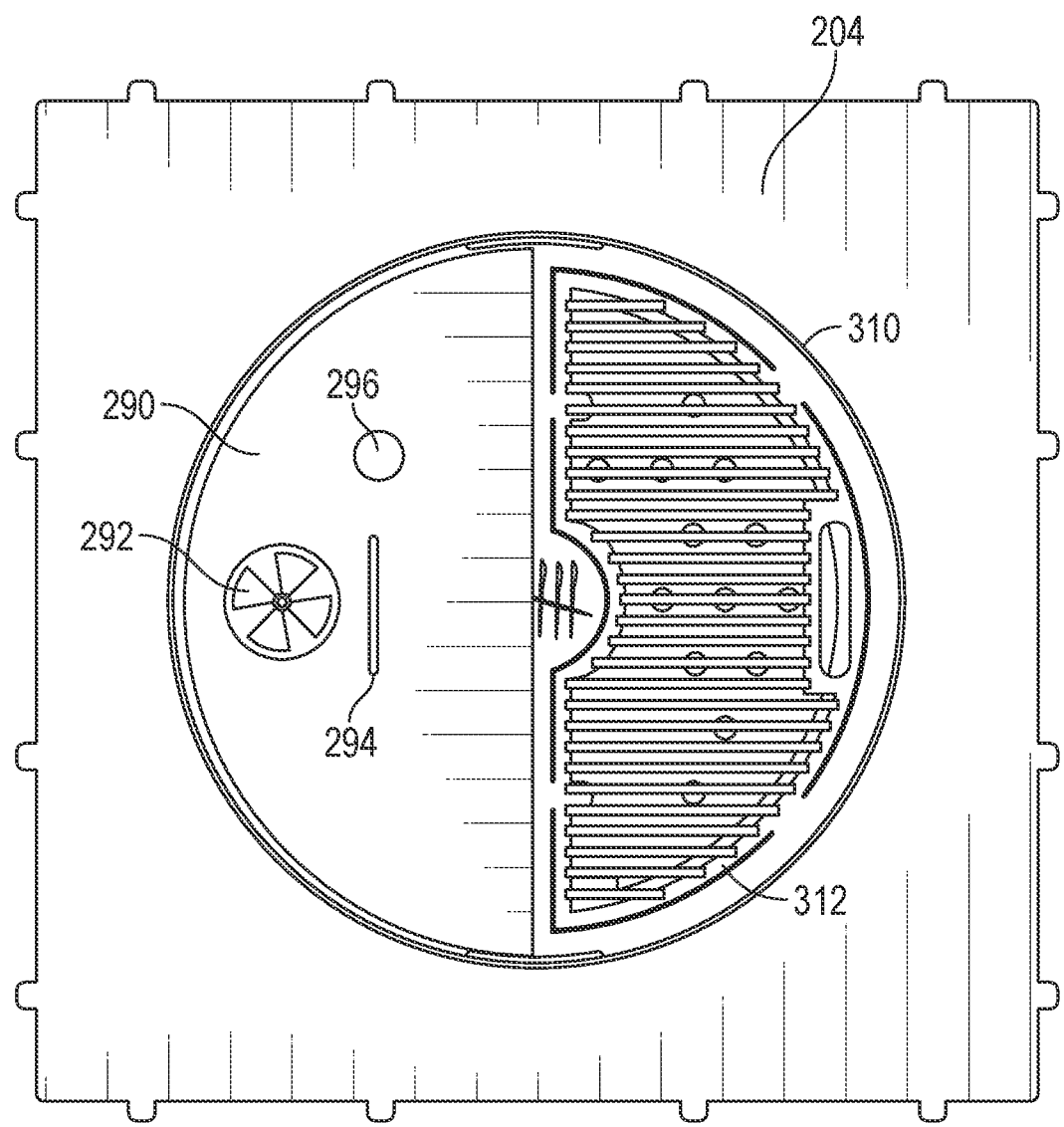
FIG. 22 illustrates an alternative exemplary grill frame, grill components, and grill hood constructed in accordance with one or more embodiments of the disclosure.

Referring now to FIG. 22, an alternative exemplary grill frame, grill components, and grill hood are provided. The grill frame 310 may be constructed similar to the grill frames 110 and 120 described above, except that the grill frame 310 may be constructed to accommodate two grill components 312. For example, the grill components 312 may include two semicircular grill components. Accordingly, as shown in FIG. 22, the corresponding grill hood 290 may have a corresponding semicircular shape. The grill hood 290 may further include a handle 294, a ventilation port 292 (such as a daisy vent or the like), and/or a thermometer 296. Although FIG. 22 depicts the grill frame 310 in use with the grill frame support 204, it will be understood that the grille frame 310 may be used with the ring 104 of apparatus 100.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A convertible fire pit, grill, griddle, smoker and table apparatus, the apparatus comprising:
    a bowl;
    a grill frame support positionable about the bowl, the grill frame support comprising a circular aperture and two shelf brackets;
    a shelf attachable to an outer edge of the grill frame support, the shelf comprising pins and configured to be coupled to the two shelf brackets such that the pins engage the shelf brackets and the shelf is secured to the grill frame support;
    a grill frame positionable about the grill frame support, the grill frame configured to rotate about the grill frame support; and
    one or more grill components positionable about the grill frame.

2. The apparatus of claim 1, further comprising a grate positionable within the bowl.

3. The apparatus of claim 1, further comprising a hood configured to be disposed above the grill frame.

4. The apparatus of claim 1, further comprising one or more grill hoods configured to be disposed above the one or more grill components.

5. The apparatus of claim 4, wherein the one or more grill hoods comprise a retractable vent.

6. The apparatus of claim 4, wherein the one or more grill hoods comprise a thermometer.

7. The apparatus of claim 1, wherein the bowl comprises a port configured to provide an air flow into the bowl.

8. The apparatus of claim 1, wherein the bowl comprises a support.

9. The apparatus of claim 8, wherein the support comprises one or more legs extending from the bowl.

10. The apparatus of claim 9, further comprising one or more castor wheels removably coupled to the one or more legs.

11. The apparatus of claim 1, wherein the grill frame support further comprises a ledge.

12. The apparatus of claim 11, wherein the two shelf brackets are disposed on opposite sides of the ledge, and wherein the shelf is configured to be disposed on top of the ledge.

13. The apparatus of claim 1, wherein the shelf brackets comprise a slot having a non-fitted portion and a fitted portion, the shelf brackets disposed on a lower surface of the grill frame support, and wherein the pins extend from a lower surface of the shelf and are configured to engage with the shelf brackets to transition the shelf from a retracted position when the pins are engaged with the non-fitted portion of the slot and an expanded position when the pins are engaged with the fitted portion of the slot.

14. The apparatus of claim 1, wherein the shelf is arcuate.

15. The apparatus of claim 1, wherein the grill frame support comprises a number of ball bearings positioned along an inner diameter of the grill frame support, and wherein the grill frame is configured to rotate about the grill frame support via the number of ball bearings.

16. The apparatus of claim 1, wherein the grill frame comprises one or more apertures, and wherein the one or more grill components are configured to interchangeably nest within the one or more apertures.

17. The apparatus of claim 1, wherein the one or more grill components comprise interchangeable grates having different grate patterns.

18. The apparatus of claim 1, further comprising a secondary grill spaced apart from the grill frame.

19. The apparatus of claim 1, wherein at least one of the one or more grill components or shelf comprises a handle.

20. The apparatus of claim 19, wherein the handle comprises a handle portion rotatably coupled to a hinge, an aperture sized to receive the handle portion, and a lip extending along one side of the aperture such that when the handle portion is positioned within the aperture, the handle portion rests on the lip and is flush with an opposite side of the aperture.

* * * * *